United States Patent Office 3,030,230
Patented Apr. 17, 1962

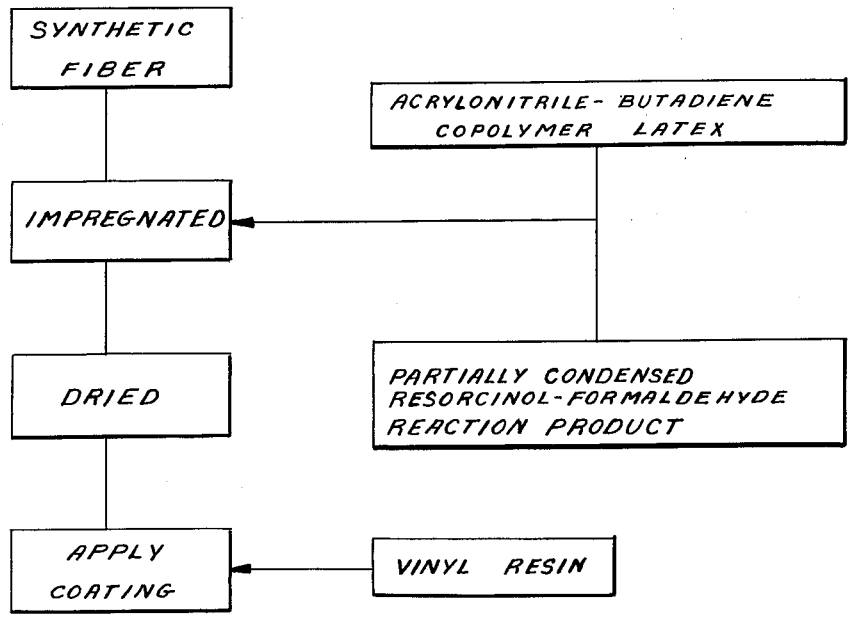

3,030,230
ADHESION OF VINYL RESINS TO NYLON OR OTHER SYNTHETIC FIBROUS MATERIALS
Everett C. Atwell, Greensboro, N.C., assignor to Burlington Industries, Inc., Greensboro, N.C., a corporation of Delaware
Filed July 15, 1960, Ser. No. 42,956
12 Claims. (Cl. 117—76)

The present application is a continuation-in-part of Serial No. 678,519, filed August 16, 1957, now U.S. Patent No. 2,961,343, and is concerned with the treatment of synthetic fibrous materials to improve the bonding characteristics of such materials to vinyl resin sheets and coatings.

Considerable difficulty has previously been experienced in developing satisfactory bonding or adhesion between vinyl resin sheets or coatings and synthetic fibrous materials, and many different procedures have been described for the purpose of overcoming these difficulties. One highly desirable procedure is described and claimed in Serial No. 678,519 wherein an improved bonding effect is obtained between vinyl resins and nylon, polyethylene terephthalate, polymeric acrylonitrile and/or other synthetic fibrous materials by impregnating the fibrous material, e.g. in the form of cloth, with an organic solvent-free, aqueous bonding dispersion including a partially condensed water-soluble resorcinol-formaldehyde reaction product and a vinyl polymer latex selected from the group consisting of polyvinyl chloride latex and vinyl chloride-vinyl acetate copolymer latex. The thus impregnated material is then heated to dry the same and a sheet or coating of vinyl resin, typically polyvinyl chloride with or without plasticizer, stabilizer, pigment and/or filler, is then applied to the treated fibrous material in conventional manner, for example, by dipping, knife spreading or the like in the case of vinyl organosols and plastisols or by lamination of a self-supporting vinyl sheet. To obtain an effective bond, the cloth or other fibrous material, with the vinyl sheet or coating applied thereto, should be subjected momentarily to a temperature sufficiently high to melt the vinyl resin and cause the same to fuse to the treated fibers. The fusing temperature for unsupported vinyl sheeting usually runs between 300° and 350° F. and for organosols, plastisols or other types of spread films, from 350° to 390° F., depending on the composition of the vinyl film, e.g. the nature of the vinyl polymer and the amount and type of plasticizer, filler, etc., included therein. The application of pressure during the fusing operation, particularly in the case of unsupported vinyl sheeting, is also desirable to provide optimum bonding.

The present invention is directed to the surprising discovery that an unusually desirable bonding effect, which is in some cases even greater than that obtainable by the process of Serial No. 678,519, can also be obtained between synthetic fibrous materials and vinyl resins if some or all of the latex used in the binding composition of Serial No. 678,519 is replaced with an organic solvent-free butadiene-acrylonitrile copolymer rubber latex containing from 25 to 45% bound acrylonitrile. Thus, for example, it has been found in some cases that the nitrile latex modification described herein makes it possible to develop adhesions between fibrous materials and polyvinyl resin film in the range of 5 to 7 times greater than those obtainable between the same materials without any specific bonding treatment. Results such as these are completely unexpected because butadiene-acrylonitrile copolymer rubbers are well known for their poor adhesive characteristics. Nevertheless, with the special conditions and compositions of the present case, the components of the binding composition coact to render the fibrous material and vinyl film mutually adherent to a very high degree.

As in the case of Serial No. 678,519, the present invention is applicable to nylon (e.g. the synthetic linear polyamides of U.S. Patent 2,071,250 and the fiber-forming polymers obtained from epsilon-caprolactam). These materials which may be in fiber, filament, yarn or fabric form, are referred to herein for brevity as "synthetic textile materials" or "synthetic fibrous materials."

Any butadiene-acrylonitrile copolymer rubber latex containing from 25 to 45% by weight bound acrylonitrile may be used for the purposes of the present invention. It should be noted, however, that the rubber must contain the specified acrylonitrile content if the desired results are to be obtained. Typically suitable latices are available under the trade names "Chemigum," "Hycar," "Nitrex," "Butaprene" and "Paracril." These latices may be prepared in known fashion by conducting copolymerization of the butadiene and acrylonitrile in aqueous emulsion with a redox catalyst system. Normally, the latex will have a concentration of the order of 40 to 50% by weight copolymer solids and an average viscosity of about 30 to 70 centipoises at room temperature, although it will be appreciated that concentrations and viscosities outside this range may be used.

Apart from the use of the nitrile latex in lieu of, or in conjunction with, the vinyl polymer latex of Serial No. 678,519, the conditions used in Serial No. 678,519 may, in general, be followed in practicing the present invention. Thus, for example, the impregnating composition may be prepared by first mixing together resorcinol and formaldehyde in water and allowing these two compounds to react. This reaction has a time-temperature relationship, the higher the temperature, the shorter the time. The reaction may be operated within the range of from about 50° F. to 212° F. However, from a practical point of view, the reaction is more readily controlled in the lower range over the extended periods of time. At the higher temperatures, the reaction, which is exothermic, is difficult to control unless part of the formaldehyde is withheld until the balance of the formaldehyde and the resorcinol have been reacted.

An alkali catalyst, such as any of the alkali metal hydroxides, namely, lithium, sodium, potassium, rubidium, or cesium hydroxide, may be used to effect the initial reaction between the resorcinol and formaldehyde. Three to six percent of catalyst, based on the weight of the resorcinol present, has been found effective to bring about condensation of the resorcinol and formaldehyde. However, it will be appreciated that the exact amount of catalyst can be varied and the choice of suitable quantities will be within the skill of the art in any particular case.

The aqueous resorcinol-formaldehyde reaction product, as ultimately mixed with the nitrile latex, may comprise from about 6–20%, preferably about 6–10% by weight solids. This concentration range is desirable in subsequent operations to avoid gelation and gives easier control. If desired, the resorcinol-formaldehyde reaction product may initially be made up in a more concentrated form, e.g. up to about 50% solids, by withholding a part of the formaldehyde. This product, wherein only part of the formaldehyde is added initially, may be stored for long periods of time without difficulty, the balance of the formaldehyde being added with suitable ageing when the final binding mixture is formulated.

In preparing the resorcinol-formaldehyde product used herein, the ratio, in mols, of resorcinol to formaldehyde in the reaction mixture must be between 1:1.2 and 1:2.75, preferably in the range of 1:1.5 and 1:2. At the higher concentrations of formaldehyde, gelation of the final mixture is apt to occur within a matter of hours following preparation. On the other hand, if the amount of formaldehyde is decreased to the point where 1.00 molecular equivalent of resorcinol is used for each 1.4 molecular equivalents of formaldehyde, a less viscous emulsion is produced which has greater stability and a higher potential for binding polyvinyl resin compositions to the synthetic textile material. Using a preferred ratio of 1 mol. weight of resorcinol to 1.75 mol. weight of formaldehyde on a dry basis and a catalyst concentration of from 3 to 6%, based on the weight of the resorcinol used, a satisfactory resin solution is obtained by ageing at a temperature between 80° and 100° F. for a period of time varying from two hours at 100° F. to six hours at 80° F.

In the preparation of the resorcinol-formaldehyde reaction product, condensation and linear linkage take place to form a so-called resole which is water-soluble and of low viscosity. Formation of a cross-linked product is to be avoided until the fibrous material, to which the resole has been applied, is heated to effect the cross-linking which appears desirable for optimum bonding. This cross-linking apparently occurs with the reactive groups on the fiber and, in some instances, by reaction with the vinyl film.

After the resole product has been prepared, it is admixed with the butadiene-acrylonitrile latex and the resulting mixture is ready to use. To avoid gelation, the latex should be mixed with the resole-product soon after completion of the resole reaction period. For example, the resole should not be allowed to stand for a period of time greater than from about 12–20 hours before its admixture with the latex. The mixture of resole and latex also should not generally be allowed to stand for longer than 20 hours since longer standing times than this may result in gelation, poor penetration and loss of cross-linking reactivity.

Prior to its admixture with the resole, the butadiene-acrylonitrile latex is desirably diluted with water and the resole slowly added with agitation of the mixture, the resole being added in an amount sufficient to provide a ratio of resole to latex solids within the range of from about 1:12 to about 1:2.5. At a ratio of 1:2 or less, the concentration of the resole resin is so high that reaction of the components is accelerated to the point where the pot life of the composition is reduced so greatly in time that commercial use might not be practical.

The thus prepared bonding composition may be stored for a few months at temperatures between 40° and 50° F., and for from a few days to a few weeks at temperatures of from 70–80° F., without loss of physical or adhesive properties, if prepared within the specified preferential ratios of resorcinol to formaldehyde and of resole solids to butadiene-acrylonitrile latex solids. Further steps may also be taken to insure the stability characteristics. Thus, it has been found that the latex-resole mixture should have an alkaline pH and preferably a pH of at least 9. If the pH is below 7, gelation will take place. Accordingly, for the purpose of obtaining a stable composition, it is desirable and good practice in this invention to add aqueous ammonia to the composition where necessary to bring the pH to 9 to assure and maintain this condition of alkalinity. The aqueous ammonia may be added at any stage, that is, to the resole and to the latex individually or to the mixture of these two. It is preferable to add it diluted at least 50% with water and the amount to be added is that required to bring the pH up to about 9. The amount of ammonia added can be varied so long as a sufficient quantity is present to preserve the desired alkalinity discussed above. Other additives, e.g. stabilizers, wetting agents and vulcanizing agents may also be included in the composition.

After the above described resole/latex mixture has been obtained, the fibrous material, e.g. nylon fabric, may be impregnated therewith by any suitable means such as, for instance, dipping, padding or spraying the material. The amount of the impregnating composition deposited on the material will vary depending on the weight and construction of the fibrous material and other factors. In the case of nylon fabric, for example, and using the composition of this invention, the amount of add-on solids to be applied will usually fall within the range of 5 to 15% by weight of the fabric. The specific amount of add-on solids necessary to give maximum mutual bonding in any given situation will vary and must be determined for the given bonding composition and fibrous material involved.

After impregnation, the water should be removed from the goods by drying. Particular attention must be directed to carrying out this drying operation under such conditions as to avoid cross-linking of the bonding composition at this stage. Various drying temperatures may be used so long as the fibrous material is not heated significantly beyond the point where it is dry. Thus, for example, in a continuous drying apparatus, drying air having any desired temperature may be used to remove water from the fibrous material. However, the speed of travel through the dryer must be regulated so that the fibrous material leaving the drying area is just dry and preferably has not reached a temperature in excess of 230° F. Should the speed of drying be so slow as to permit the fibrous material to rise to a level of, for example, 270–300° F., cross-linking of the bonding composition or finish within itself and to the reactive sites of the fiber will take place thereby prematurely converting the resole to the insoluble, infusible state in which condition it has considerably lower bonding affinity for the vinyl resin film.

The finished fabric or like fibrous material, after the above described drying operation, may be bonded to any type of vinyl resin film in conventional manner, e.g. by laminating, coating, calendering, etc., as previously mentioned, after which the vinyl film is fused by heating in the manner heretofore described. As indicated above, it is in this fusing operation that the resorcinol-formaldehyde reaction product (the resole) is cross-linked within and to the fibrous structure and, to whatever degree it may do so, to the vinyl film.

The dried fabric or other form of fibrous material prepared in the manner described above, is characterized by its non-tacky nature and can be rolled up and stored for long periods of time without losing its bonding affinity for the vinyl film. As will be appreciated, this represents an outstanding advantage since the dried fibrous material can be readily stored until the vinyl film is to be applied thereto. A unique feature of the dried material is that, even after long storage, no reactivation of the treated fabric surface is necessary for effective bonding with the vinyl film. This is in contrast to known adhesive treated fabrics wherein reactivation, for example, by solvent treatment or water, is essential to effect bonding after storage.

In the accompanying schematic drawings, FIGURE 1 shows the composite product of vinyl resin bonded to the fiber by means of the resole/latex adhesive; FIGURE 2 shows how the adhesive-treated fibrous material may be rolled up and stored pending application of the vinyl film; and FIGURE 3 is a flow diagram showing the various steps of the present process.

The following examples are provided by way of illustrating, without limiting, the invention, parts being by weight unless otherwise indicated.

EXAMPLE I

*Adhesive Composition*

PART A

| | Parts, approximately |
|---|---|
| Resorcinol | 5.1 |
| 37% formaldehyde | 6.5 |
| NaOH flakes | .15–.30 |
| Water | 110 |
| | 122 |

PART B

| | Parts, approximately |
|---|---|
| Resin Master (Part A) | 122 |
| 42% butadiene-acrylonitrile copolymer latex (Hycar 1571) | 181 |
| 10% Igepal CO-880 | 9.4 |
| 20% Dow Antifoam B | 10 |
| Water | 260 |
| | 582.4 |

PREPARATION OF PART A

90% of the water for Part A was measured into the resin preparation tank. The caustic soda flakes were added and the mixture stirred until the caustic was dissolved. The resorcinol was then added and dissolved by stirring. The formaldehyde and balance of the water were then added, the temperature of the water having been previously adjusted to 80° F. The resulting mixture was aged for 6 hours under controlled temperature conditions of 80–84° F. At the end of the 6 hours, the resulting resole resin solution (Part A) was used in the preparation of the bonding composition (Part B).

PREPARATION OF PART B

The Hycar 1571 was measured into a mixing tank with stirring. The Igepal solution was added followed by the antifoam solution. The water and resin solution (Part A) were then slowly added. The resulting dispersion was ready for immediate use but may be stored for a limited time at room temperature or for prolonged periods of time under refrigeration.

A piece of 5 oz. square weave nylon fabric was impregnated with the bonding composition prepared above by padding or passing the fabric through the rolls of a two-roll pad, followed by drying at a temperature of 220° F., heating being discontinued when the fabric was just dry. The thus dried fabric was then coated on one side only with a vinyl plastisol by knife spreading followed by fusing in an oven at 380° F., for an elapsed time of 40 seconds.

In the fusing operation, the duration of contact between the goods undergoing treatment and hot air in the oven may be controlled by the temperature and speed of the goods through the oven. Should vapors of plasticizer appear at points prior to exit of the goods from the fusing chamber, the speed of travel of the goods should be increased. Otherwise, there might be some degradation of the base fiber itself and unnecessary and undesirable loss of plasticizer through vaporization. On the other hand, if no plasticizer vapor appears, fusing of the plastisol may be incomplete so that maximum bond and film formation are not obtained. Under preferred conditions, the oven temperature and speed of the material through the oven should be so regulated that a small amount of plasticizer vapor is formed just at the oven exit.

The fabric processed in the manner indicated above exhibited an adhesive bond to vinyl film of approximately 18 pounds per inch of width, on a peel test at a jaw speed of separation of 2 inches per minute.

The plastisol used in the above example comprised 100 parts Geon 121 (a high molecular weight polyvinyl chloride); 50 parts dioctyl phthalate; 15 parts dioctyl sebacate; 15 parts filler; 5 parts titanium dioxide and 3 parts heat and light stabilizer.

EXAMPLE II

The process of Example I was repeated except that Part A of the bonding composition was prepared in two separate stages. First, a so-called "arrested resin solution" was prepared using the following proportions:

| | Parts |
|---|---|
| Resorcinol | 5.1 |
| NaOH flakes | .3 |
| 37% formaldehyde | 2.15 |
| Water | 4.9 |
| Total | 12.45 |

This arrested solution was prepared by first adding the water to a suitable tank or drum. The NaOH flakes were then added and dissolved by stirring followed by addition and dissolution of the resorcinol. Thereafter, the formaldehyde was added, considerable heat being generated. The tank was cooled to prevent boiling and, after allowing the contents to cool, the resulting composition was stored in stainless steel or lined drums sealed to prevent entrance of air. This composition may be stored for an indefinite period of time as compared to not more than about 20 hours for the Part A composition of Example I.

The required amount of the arrested resin solution (12.45 parts) was transferred from the storage drum to the reaction tank. To this arersted resin solution were added 4.3 parts of 37% formaldehyde and 108 parts of water, the water being added first, with agitation. The resulting mixture was aged for from 1–6 hours at 80–84° F.

After the ageing period, a dispersion with Hycar latex was prepared as in Example I and applied in the manner described therein with equivalent results.

It will be appreciated that various modifications may be made in the invention described herein. For instance, self-supporting vinyl sheeting may be fused to the fibrous material under heat and pressure in lieu of the vinyl plastisol used in the above examples. Thus, the scope of the invention is set forth in the appended claims wherein I claim:

1. A process for improving the bonding characteristics of nylon fibrous material to a vinyl resin which comprises impregnating the material with an organic solvent-free, aqueous bonding mixture including a partially condensed resorcinol-formaldehyde reaction product and an acrylonitrile-butadiene copolymer rubber latex containing from 25 to 45% by weight bound acrylonitrile, and then drying the impregnated material.

2. The process of claim 1 wherein the ratio of resorcinol-formaldehyde reaction product to latex solids is within the range of about 1:12 to about 1:2.5.

3. The process of claim 2 wherein said material is dried at a temperature not exceeding 230° F.

4. The process of claim 1 including the additional step of applying a layer of polyvinyl resin to the dried material and heating the resulting product at an elevated temperature sufficient to fuse said resin to said material.

5. The process of claim 1 wherein said latex has a pH of at least 7.

6. The process of claim 1 wherein said latex has a pH of at least 9.

7. The process of claim 1 wherein the resorcinol-formaldehyde reaction product has a solids content of between 6 and 20% by weight.

8. The dried fibrous material obtained by the process of claim 1.

9. A process for bonding nylon fibrous materials to a vinyl resin which comprises (a) preparing an aqueous dispersion of partially condensed, water soluble resorcinol-formaldehyde reaction product by reacting resorcinol and formaldehyde in a ratio of from 1:1.2 to 1:2.75 in water and in the presence of an alkali catalyst; (b) mixing said aqueous dispersion with an organic solvent-free acrylonitrile-butadiene copolymer rubber latex containing from 25 to 45% by weight bound acrylonitrile in an amount such that the ratio of resorcinol-formaldehyde reaction product to latex solids is within the range of about 1:12 and 1:2.5; (c) then impregnating said material with the resulting aqueous organic solvent-free mixture of resorcinol-formaldehyde reaction product and latex; (d) drying the thus impregnated material at a temperature up to 230° F., and then (e) applying a coating of vinyl resin to the surface of the dried material.

10. The product obtained by the process of claim 9.

11. A synthetic fibrous material which has a high bonding affinity for vinyl resin, said fibrous material comprising nylon treated with a partially condensed resorcinol-formaldehyde reaction product and an acrylonitrile-butadiene copolymer rubber latex containing from 25 to 45% by weight bound acrylonitrile, said fibrous material being characterized by its dry, non-tacky nature whereby said material may be rolled up and stored without losing its bonding affinity for said resin.

12. The product of claim 11 wherein said resorcinol-formaldehyde reaction product is obtained by reacting resorcinol and formaldehyde in a ratio of from 1:1.2 to 1:2.75 in water and in the presence of an alkali catalyst and the ratio of said reaction product to latex solids is within the range of about 1:12 and 1:2.5.

References Cited in the file of this patent

UNITED STATES PATENTS

| | | |
|---|---|---|
| 2,514,196 | Bradley | July 4, 1950 |
| 2,674,547 | Paxton et al. | Apr. 6, 1954 |
| 2,758,049 | Kalafus | May 29, 1956 |
| 2,898,237 | Sapper | Aug. 4, 1959 |